UNITED STATES PATENT OFFICE.

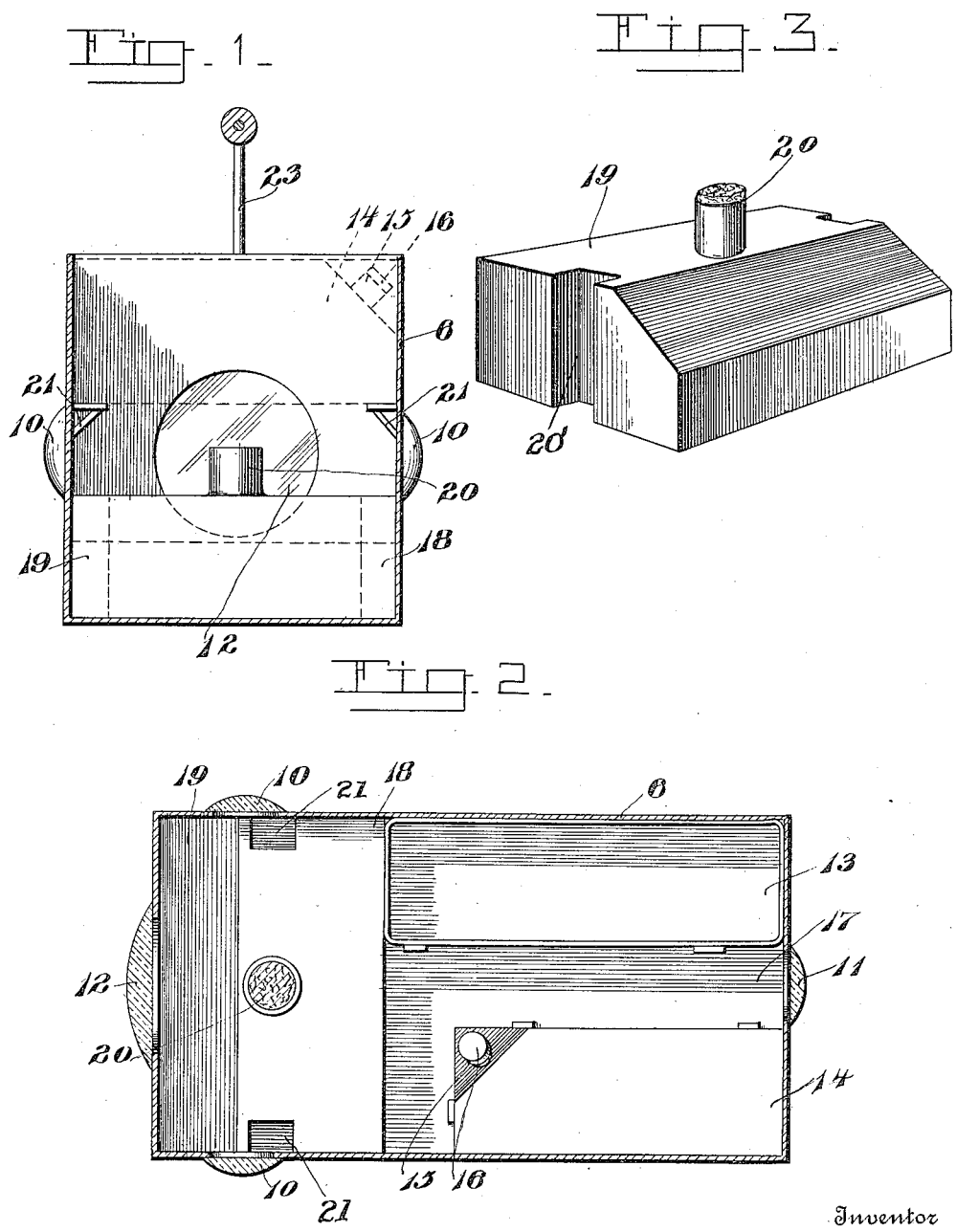

SILVERWOOD PHELPS, OF MILLER, INDIANA, ASSIGNOR OF ONE-HALF TO J. WILLIAM NIEWKIRK, OF GARY, INDIANA.

DINNER-PAIL.

1,069,462.

Specification of Letters Patent.

Patented Aug. 5, 1913.

Application filed December 31, 1910. Serial No. 600,321.

*To all whom it may concern:*

Be it known that I, SILVERWOOD PHELPS, a citizen of the United States, residing at Miller, in the county of Lake and State of Indiana, have invented new and useful Improvements in Dinner-Pails, of which the following is a specification.

The invention relates to pails, and more particularly to the class of dinner pails.

The primary object of the invention is the provision of a pail in which victuals may be conveniently carried and maintained warm, the pail being provided with a spirit lamp, and also varying colored bull's-eyes, so that the rays of light from the lamp may be cast therethrough, thus enabling the pail to be utilized as a signaling medium, and also aiding the user in finding his way after dark.

Another object of the invention is the provision of a pail in which liquids, such as coffee and tea may be heated and food sustained warm, thus assuring a warm meal for the possessor of the pail, the food and liquid receptacles being readily and easily removed from the pail when the occasion may require.

A further object of the invention is the provision of a pail in which there is arranged a series of bull's-eyes, one being of plain glass, while the others are of red and green glass, respectively, thus, through the medium of a spirit lamp within the pail, the latter may be utilized as a signaling device for a pedestrian, and at the same time enabling the convenient carrying of food and drinks that will be maintained warm when confined within the pail.

A still further object of the invention is the provision of a pail which is thoroughly sanitary, simple of construction, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a vertical transverse sectional view through the pail the parts being shown partly in elevation. Fig. 2 is a longitudinal horizontal sectional view through the pail. Fig. 3 is a detail perspective view of a spirit lamp removed from the pail.

Similar reference characters indicate corresponding parts throughout the several views of the drawings.

Referring to the drawings by numerals, the pail comprises a rectangular box-like body 6. Near one end of the pail are provided suitable alining openings, the same being covered by bull's-eyes 10, while in opposite ends of the said body 6 are provided suitable openings, the same being covered by bull's-eyes 11 and 12, respectively. The bull's-eye 12 is of considerably greater size than the bull's-eye 11, and is of plain glass, whereas the bull's-eye 11 is of red glass, the bull's-eyes 10 being of green glass. Thus, when light rays are flashed through the red bull's-eye 11 it will serve as a danger signal, and when light is flashed through the plain glass bull's-eye 12, it will serve as a means for lighting the path of the user of the pail. The green bull's-eye 10 will serve in giving notice to vehicles or other moving objects that something is ahead.

Removably fitted within the body 6 and resting upon the bottom thereof is an independent sauce or food tray 13, and a liquid tank 14, the latter being chamfered at one corner thereof at its top, and from which projects a pouring spout 15, the same being closed by a removable cap 16. It will be evident that by chamfering the corner of the tank 14, it will prevent the spout 15 from protruding beyond the planes of the side and top walls of the tank. The tank 14 and tray 13 are positioned within the body, so as to form a medial light space 17, the said tray and tank being of considerably less length than the length of the body 6, so as to afford a lamp space 18 within the body 6 at one end thereof, and into this space 18 is removably fitted a spirit lamp 19, the latter being provided with a burner 20, which, when lighted, directs its rays to the bull's-eyes 11 and 12 for the spreading of light therethrough for the purposes heretofore described. The spirit lamp 19 has its upper surface at one side inclined downwardly and terminating immediately below the bull's-eye 12 so as not to obstruct the light's rays from passing through said eye.

Fixed to and projecting inwardly from the side walls of the body 6 are suitable brackets or rests 21, on which may be removably held the liquid tank 14, so that it will be disposed directly above the burner 20 of the spirit lamp 19, thus enabling the heating of the contents of the tank 14, whether the said contents be coffee or tea. The spirit lamp 19, at opposite ends, is provided with vertical slots 20', through which are adapted to pass the brackets 21 on the placing of the lamp within the lamp space 18 in the body 6, so that the lamp may be lowered onto the bottom of the body below the brackets.

Superimposed upon the tray 13 and tank 14, within the body 6 of the pail, is a removable food receiver 22, which is adapted to contain victuals for the convenient carrying thereof in the dinner pail, it being evident that the receiver 22 may be readily removed from the body 6 of the pail, when it is desired to clean the same for the ready and easy filling of the receiver with victuals.

Connected to the end walls of the body 6 of the pail is a swinging handle or bail 23, the latter being pivotally connected to the body 6 in any suitable manner. By means of this handle, the pail may be readily and easily carried in the hands of the user.

The side walls of the body 6 are provided with a plurality of vents or orifices 24, which permit the heat or smoke from the spirit lamp to escape from the body 6 of the pail to the atmosphere.

What is claimed is:

In a device of the class described, a receptacle having alining bull's-eyes at the opposite sides and ends thereof, inwardly extending brackets secured at directly opposite points to the sides of the receptacle, a spirit lamp comprising a substantially rectangular body snugly fitted within said receptacle below the bull's-eyes and said brackets, a receptacle supported by said brackets above said lamp, and said lamp having its upper surface adjacent one side inclined downwardly and terminating below one of said bull's-eyes in one end of said receptacle substantially as and for the purpose described.

In testimony whereof I affix my signature in presence of two witnesses.

SILVERWOOD PHELPS.

Witnesses:
 BEATRICE LEVEY,
 CLYDE HUNTER.

Copies of this patent may be obtained for five cents each, by addressing the "Commissioner of Patents, Washington, D. C."